United States Patent
Jang et al.

(10) Patent No.: US 6,898,040 B2
(45) Date of Patent: May 24, 2005

(54) METHOD AND APPARATUS DETERMINING MAXIMUM READ BIAS CURRENT AND MAXIMUM WRITE CURRENT FOR DISK MERGED READ/WRITE HEADS BASED UPON WRITE CURRENT AND MEASURED READ RESISTANCE

(75) Inventors: Eun Kyu Jang, San Jose, CA (US); Hung Jai Lee, San Jose, CA (US)

(73) Assignee: Samsung Electronics Co., LTD, Suwon (KR)

( * ) Notice: Subject to any disclaimer, the term of this patent is extended or adjusted under 35 U.S.C. 154(b) by 696 days.

(21) Appl. No.: 10/006,512

(22) Filed: Dec. 6, 2001

(65) Prior Publication Data

US 2003/0117737 A1 Jun. 26, 2003

(51) Int. Cl.[7] .................................................. G11B 5/03
(52) U.S. Cl. ........................................................ 360/66
(58) Field of Search .................................... 360/66, 46

(56) References Cited

U.S. PATENT DOCUMENTS

| | | | |
|---|---|---|---|
| 5,854,725 A | 12/1998 | Lee | |
| 5,910,862 A | 6/1999 | Ogawa et al. | |
| 5,969,896 A | * 10/1999 | Nakamoto et al. | 360/66 |
| 6,097,568 A | 8/2000 | Ekhoff | |
| 6,195,219 B1 | * 2/2001 | Smith | 360/66 |
| 6,239,943 B1 | 5/2001 | Jennings et al. | |

FOREIGN PATENT DOCUMENTS

| | | |
|---|---|---|
| JP | 2000-322870 | 11/2000 |
| JP | 2000-322871 | 11/2000 |
| JP | 2000-331460 | 11/2000 |

* cited by examiner

*Primary Examiner*—David Hudspeth
*Assistant Examiner*—Rocio Colon
(74) *Attorney, Agent, or Firm*—Gregory Smith & Associates; Leffery P. Aiello; Earle Jennings (57) ABSTRACT

The invention includes operating a merged read/write head in a disk drive by determining both the maximum read bias current and maximum write current, based upon the measured read resistance of the read mechanism and the write current in use with the write mechanism. Both the read mechanism and write mechanism are near each other in the merged read/write head.

44 Claims, 8 Drawing Sheets

METHOD AND APPARATUS DETERMINING MAXIMUM READ BIAS CURRENT AND MAXIMUM WRITE CURRENT FOR DISK MERGED READ/WRITE HEADS BASED UPON WRITE CURRENT AND MEASURED READ RESISTANCE

TECHNICAL FIELD

This invention relates to the control of a merged type magneto-resistive head during the read process in a disk drive, including at least any of the collection comprising MR (Magneto-resistive), GMR (Giant Magneto-resistive), and TMR (Tunneling Magneto-resistive) read-write head.

BACKGROUND ART

Disk drives are an important data storage technology, which is based on several crucial components. These components include the interconnection between the read/write heads, which actually communicate with a disk surface containing the data storage medium, and the read/write interfaces of the disk drive. This invention involves the control of the read/write heads during read operations in terms of setting at least the read mechanism's current.

Figure 1A:
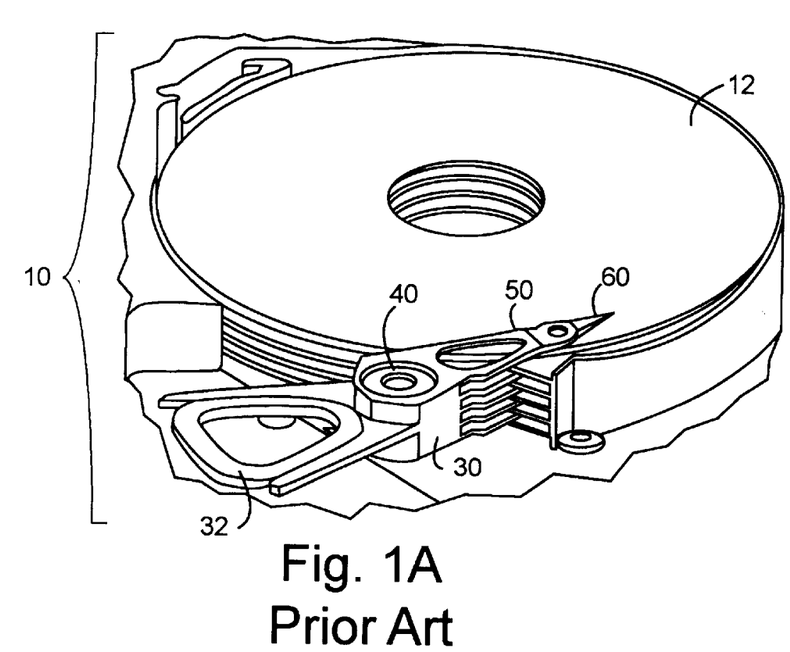
FIG. 1A illustrates a typical prior art high capacity disk drive 10 including actuator arm 30 with voice coil 32, actuator axis 40, suspension or head arms 50–58 with slider/head unit 60 placed among the disks.

FIG. 1A illustrates a typical prior art high capacity disk drive 10 including actuator arm 30 with voice coil 32, actuator axis 40, suspension or head arms 50–58 with slider/head unit 60 placed among the disks.

Figure 1B:
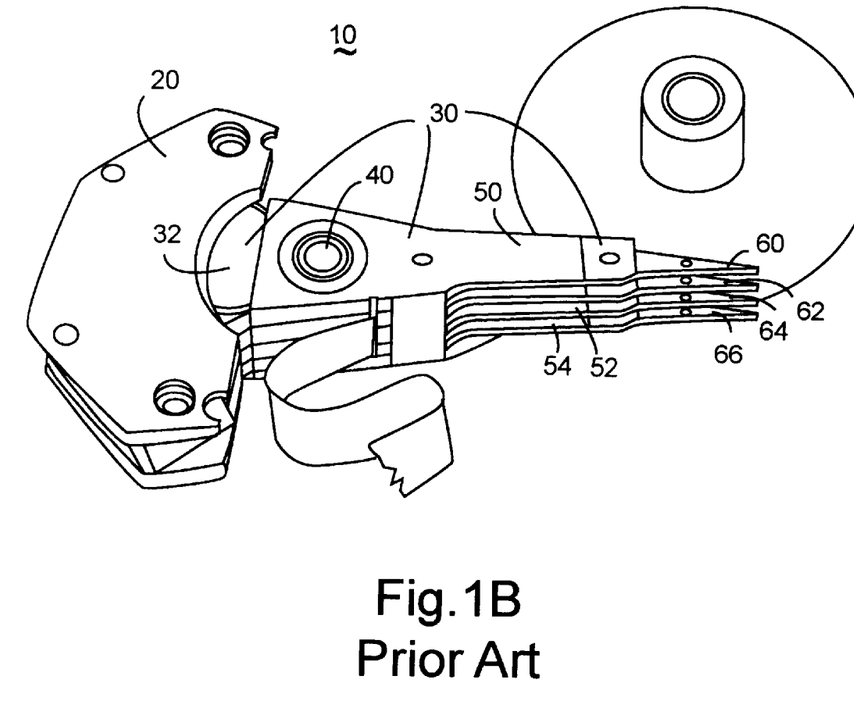
FIG. 1B illustrates a typical prior art high capacity disk drive 10 with actuator 20 including actuator arm 30 with voice coil 32, actuator axis 40, head arms 50–56 and slider/head units 60–66 with the disks removed.

FIG. 1B illustrates a typical prior art high capacity disk drive 10 with actuator 20 including actuator arm 30 with voice coil 32, actuator axis 40, head arms 50–56 and slider/head units 60–66 with the disks removed.

Since the 1980's, high capacity disk drives 10 have used voice coil actuators 20–66 to position their read/write heads over specific tracks. The heads are mounted on head sliders 60–66, which float a small distance off the disk drive surface when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electro-magnetic field induced by voice coil 32 to provide a lever action via actuator axis 40. The lever action acts to move head arms 50–56 positioning head slider units 60–66 over specific tracks with speed and accuracy. Actuator arms 30 are often considered to include voice coil 32, actuator axis 40, head arms 50–56 and head sliders 60–66. Note that actuator arms 30 may have as few as a single head arm 50. Note also that a single head arm 52 may connect with two head sliders 62 and 64.

Merged type heads possess different components for reading and writing, because the magneto-resistive effect only occurs during reading. A merged type head typically includes a thin film head and a spin valve sensor. The primary use of the thin film head is in the write process. The spin valve sensor is used for reading.

MR heads have several advantages over earlier approaches, using a single component, for both read and write. Earlier read/write heads were a study in tradeoffs. The single component, often a ferrite core, would have increased read sensitivity with additional windings about the core. However, these added windings made the ferrite core write less efficiently.

Introduced in the 1990's, merged heads brought significant increases in areal density. A merged type head reads the disk surface using a conductive thin film, the spin valve, whose resistance changes in the presence of a magnetic field. By separating the functions of writing and reading, each function can be optimized further than would be possible for the older read/write heads. For all the improvement that merged heads bring, their control to date creates problems. However, before discussing these problems, consider first how and what controls these devices in contemporary disk drives.

Figures 2A, 2B:
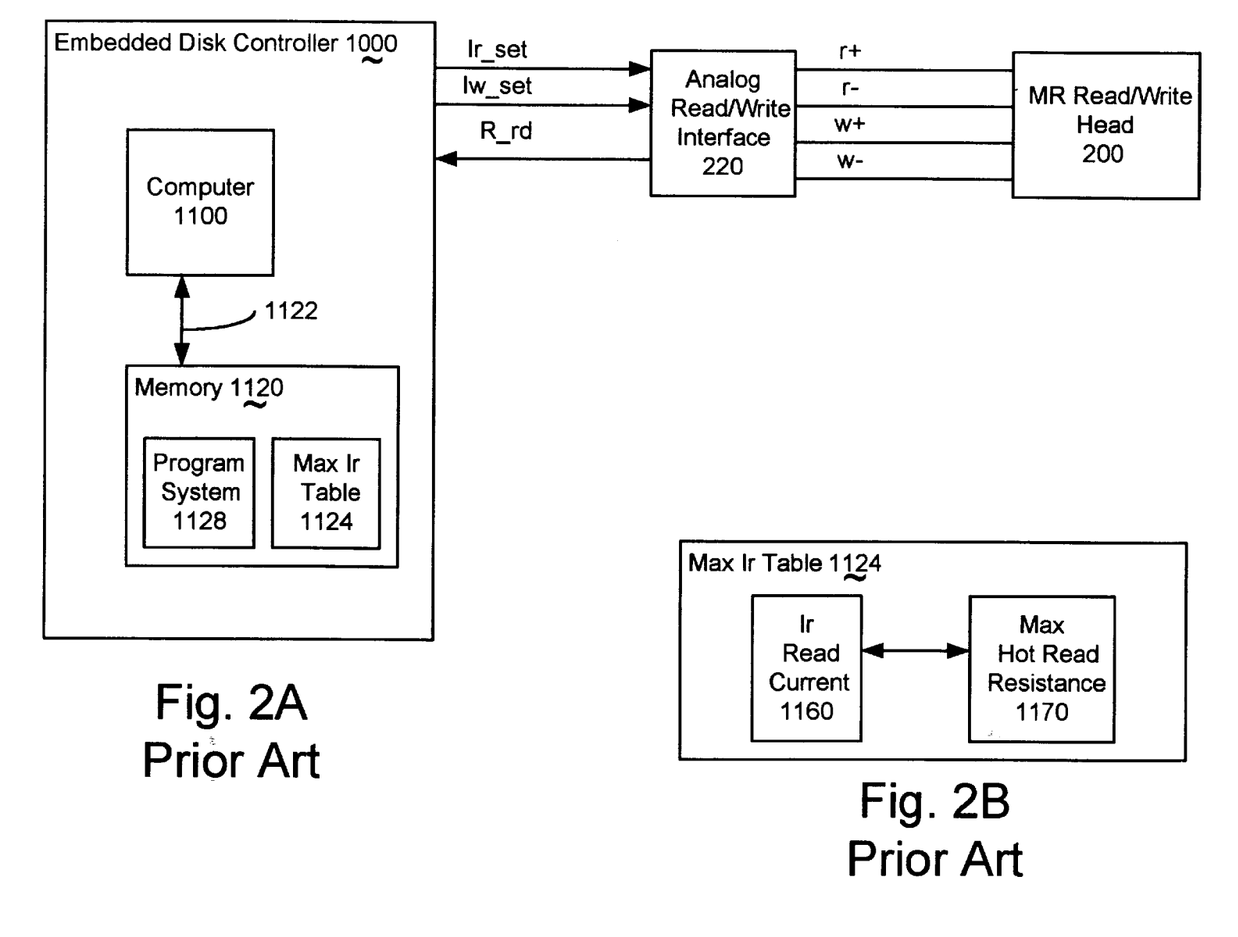
FIG. 2A illustrates a simplified schematic of a disk drive controller 1000 controlling an analog read/write interface 220, the read differential signal pair (r+ and r−) and write differential signal pair (w+ and w−) communicating the resistivity found in the spin valve within MR read/write head 200 of the prior art.
FIG. 2B illustrates Max_Ir table 1124 as found in FIG. 2A.

FIG. 2A illustrates a simplified schematic of a disk drive controller 1000 controlling an analog read/write interface 220, the read differential signal pair (r+ and r−) and write differential signal pair (w+ and w−) communicating the resistivity found in the spin valve within MR read/write head 200 of the prior art.

FIG. 2B illustrates Max_Ir table 1124 as found in FIG. 2A.

Computer 1100 within embedded disk controller 1000 receives readings of the spin valve resistance R_rd from analog read/write interface 220. Computer 1100 also controls the read current Ir_set for read differential signal pair r+ and r−, as well as the write current Iw_set for write differential signal pair w+ and w−.

The process of reading the data storage surface using MR read/write head 200 includes the following. Computer 1100 accesses 1122 a memory 1120. Memory 1120 contains program system 1128 and the Max Ir table 1124. Program system 1128 and Max Ir table 1124 are part of the process of determining R_rd, Ir_set, and Iw_set, as well as asserting currents on the read and write differential signal pairs.

Memory 1120 typically includes a non-volatile memory component. This non-volatile memory component is often used to store program system 1128 as well as Max Ir table 1124.

Today, a disk drive performs an initialization process often known as read channel optimization. Read channel optimization is supposed to find the best parameters for read/write operation, which include at least read a bias current (Ir), write current Iw and write boost. To prevent damage and/or degradation of the read head due to high Ir during and after read channel optimization, a maximum allowed Ir 1160 based upon a measured hot MR read resistance 1170 is placed the Max Ir table 1124.

Generating the table includes measuring the hot MR read resistance typically at a value such as Ir=4 mA, and then selecting a read bias current Ir lower than the maximum allowed Ir current Ir 1160 associated with the measured hot MR read resistance 1170 as found in the table 1124.

The Max Ir table 1124 is usually based on the lifetime estimation of the spin valve and can be determined at a head arm component level after a stress test often known as an "electro-migration test". The test conditions are typically over a range such as Ir from 4 mA to 7 mA and temperature from 110 degrees C. to 150 degrees C. Such tables often have the form shown in Table 1.

TABLE 1

A look-up table 1128 determining the maximum read current Ir based upon read bias resistance.

| Ir Read Current | Max Hot MR Read Resistance |
|---|---|
| 4.0 mA | 55 ohm |
| 4.4 mA | 48 ohm |
| 4.8 mA | 44 ohm |
| 5.2 mA | 41 ohm |
| 5.6 mA | 38 ohm |
| 6.0 mA | 36 ohm |

TABLE 1-continued

A look-up table 1128 determining the maximum read
current Ir based upon read bias resistance.

| Ir<br>Read Current | Max Hot MR Read<br>Resistance |
|---|---|
| 6.4 mA | 33 ohm |
| 6.8 mA | 31 ohm |

Figure 3A:
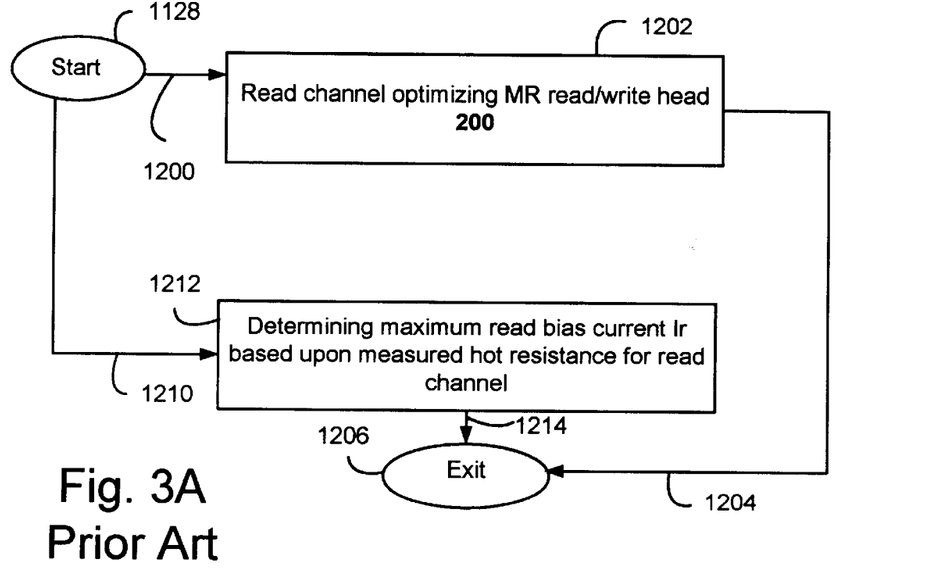
FIG. 3A illustrates a detail flowchart of prior art program system 1128 of FIG. 2A for operating MR read/write head 200.

FIG. 3A illustrates a detail flowchart of prior art program system 1128 of FIG. 2A for operating MR read/write head 200.

Arrow 1200 directs the flow of execution from starting operation 1128 to operation 1202. Operation 1202 performs read channel optimizing MR read/write head 200. Arrow 1204 directs execution from operation 1202 to operation 1206. Operation 1206 terminates the operations of this flowchart.

Arrow 1210 directs the flow of execution from starting operation 1128 to operation 1212. Operation 1212 performs determining the maximum read bias current Ir based upon measured hot resistance for read channel. Arrow 1214 directs execution from operation 1212 to operation 1206. Operation 1206 terminates the operations of this flowchart.

Figure 3B:
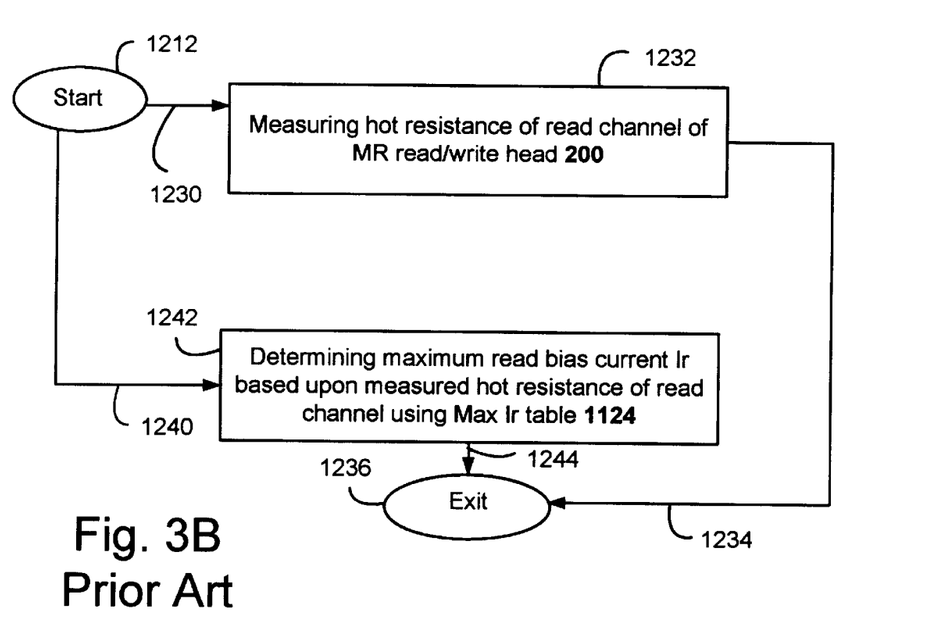
FIG. 3B illustrates a detail flowchart of prior art operation 1212 of FIG. 3A for determining the maximum read bias current Ir based upon measured hot resistance for read channel.

FIG. 3B illustrates a detail flowchart of prior art operation 1212 of FIG. 3A for determining the maximum read bias current Ir based upon measured hot resistance for read channel.

Arrow 1230 directs the flow of execution from starting operation 1212 to operation 1232. Operation 1232 performs measuring the hot resistance of the read channel of MR read/write head 200. Arrow 1234 directs execution from operation 1232 to operation 1236. Operation 1236 terminates the operations of this flowchart.

Arrow 1240 directs the flow of execution from starting operation 1212 to operation 1242. Operation 1242 performs determining maximum read bias current Ir based upon measured hot resistance of read channel using Max Ir table 1124. Arrow 1244 directs execution from operation 1242 to operation 1236. Operation 1236 terminates the operations of this flowchart.

While this has been the accepted way to control the read bias current for many years, it does not fully account for the physical situation in which these merged read/write head are used.

The temperature of a spin-valve depends upon the inside temperature of the disk drive, read bias current Ir, MR resistance of the spin valve and interconnect design between the analog interface, particularly the preamplifier and the head slider.

However, the writing operation is not considered in the prior art. When either the operational frequency rises and/or the total number of read/write heads within a disk drive decrease, the read mechanism experiences a significant temperature rise due to writing. This is particularly true when both the operational frequency rises and the total number of read/write heads within the disk drive decrease. Note that even a 10 degree, much less 40 degree, Centigrade temperature rise may significantly effect read mechanism stability and/or overall disk drive life expectancy.

The nature of the significance is two-fold: Increased temperatures tend to make the read mechanism less stable. The lifetime of the merged read/write head may be shortened.

Figure 4A:
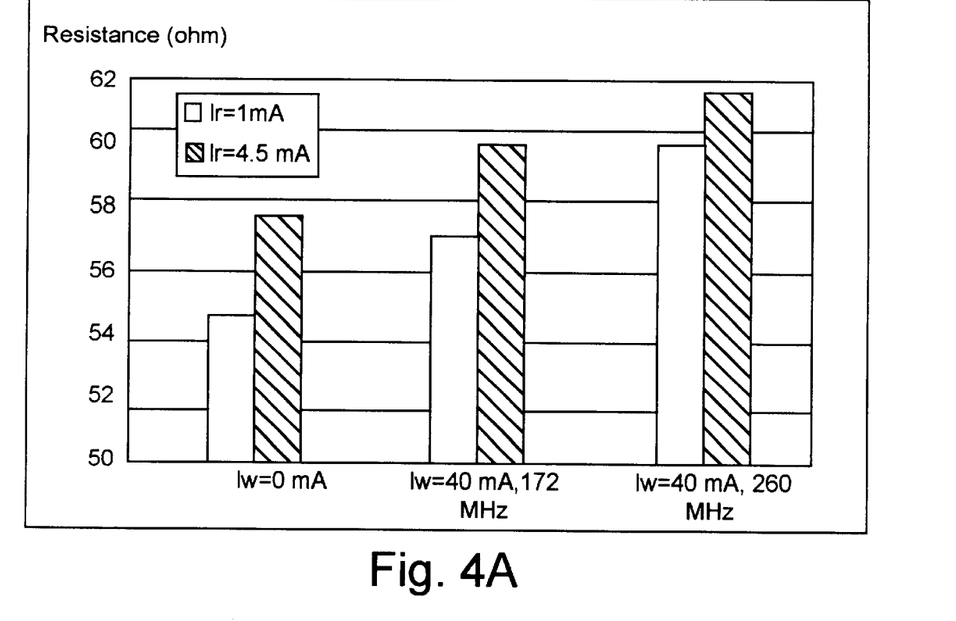
FIG. 4A presents findings by the inventors showing the MR resistance of a spin valve in Ohms along the vertical axis and various combinations of write currents Iw and operational frequencies for two read bias Ir current settings of 1 mA and 4.5 mA.

FIG. 4A presents findings by the inventors showing the MR resistance of a spin valve in Ohms along the vertical axis and various combinations of write currents Iw and operational frequencies for two read bias Ir current settings of 1 mA and 4.5 mA.

Figure 4B:
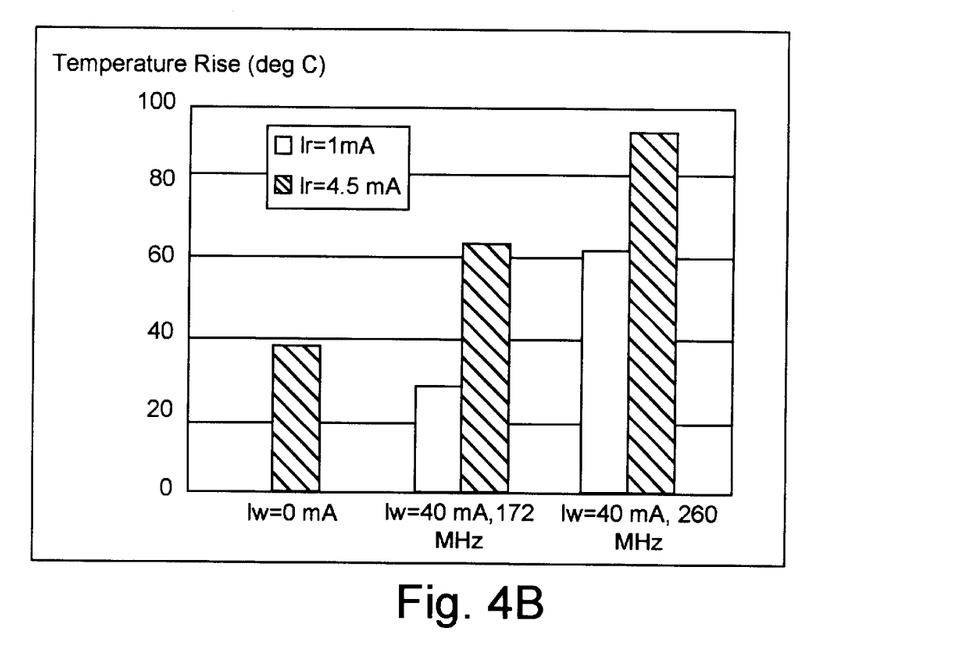
FIG. 4B presents findings by the inventors showing the temperature of a spin valve in degrees Centigrade along the vertical axis and various combinations of write currents Iw and operational frequencies for two read bias Ir current settings of 1 mA and 4.5 mA.

FIG. 4B presents findings by the inventors showing the temperature of a spin valve in degrees Centigrade along the vertical axis and various combinations of write currents Iw and operational frequencies for two read bias Ir current settings of 1 mA and 4.5 mA.

Note that as the write current and operational frequency increase, the hot read resistance and head temperature rise. Additionally, both the hot read resistance and head temperature can be further seen to rise with increase in read bias current Ir, for any given combination of Iw and operational frequency.

FIG. 4B further shows over a 90 degree centigrade temperature increase in the read mechanism at Iw=40 mA, operating frequency=260 MHz and Ir=4.5 mA, which is over 50 degrees greater than the situation when Iw=0 mA and operating frequency is not taken into account. Such conditions indicate a significant heating of the read mechanism by the write mechanism, tending to reduce the stability of the read mechanism and the life expectancy of the disk drive where this occurs.

SUMMARY OF THE INVENTION

The invention includes methods of operating a merged read/write head which include determining the maximum read bias current Ir_max and maximum write current Iw_max, both based upon the measured read resistance MRR and also the write current Iw applied to the write mechanism.

The advantages of this invention over the prior art include, but are not limited to, increased read mechanism stability, and increased life expectancy of the disk drive using this method.

As used herein, a merged read/write head contains neighboring mechanisms performing read and write operations upon a disk surface. The writing mechanism induces significant heating upon the reading mechanism based at least upon the electrical current used by the writing mechanism.

Often the read operation employs a magneto-resistive effect to sense the data written upon the surface. Examples of merged read/write heads include, but are not limited to, GMR read/write heads, and TMR read/write heads.

The invention includes program systems implementing the method of operating the merged read/write head. The invention also includes embedded control systems implementing means for operating the merged read/write head. The embedded control system means may preferably include a computer accessing a memory containing the program system. The embedded system means includes finite state machines implementing the method of operation. The embedded system means also includes inferential engines implementing the method of operation as any of at least the following: A neural network. A constraint rule list. A collection of Horn clauses such as used in Prolog. A fuzzy logic rule set.

As used herein, a computer will include at least one of the following instruction processing mechanisms: a Single Instruction Single Datapath (SISD) computer, a Single Instruction Multiple Datapath (SIMD) computer, a Multiple Instruction Single Datapath (MISD) computer and Multiple Instruction Multiple Datapath (MIMD) computer. Multiple instruction processing computers may implement a single instruction set, or multiple instruction sets, some of which may be interpreted.

Memory accessed by a computer in the invention's embedded control system preferably contains a non-volatile memory component preferably used to store a table determining the maximum read current based upon the measured hot read mechanism resistance and upon the write current.

The invention includes implementations of the method of operation wherein the table is implemented as program steps determining the maximum read current and maximum write current when the measured hot read resistance and write current are within certain value ranges.

These and other advantages of the present invention will become apparent upon reading the following detailed descriptions and studying the various figures of the drawings.

DETAILED DESCRIPTION OF THE INVENTION

The invention helps to stabilize read mechanisms in merged read/wire heads of disk drives, as well as insure the life expectancy of those disk drives through the determination of the maximum read current bias supplied to the read mechanism.

The invention includes methods of determining the maximum read bias current Ir (denoted as Ir_max) and the maximum write current Iw (denoted as Iw_max). Both are based upon the measured hot resistance of the read mechanism and an indication of the write current being used in operations involving the write mechanism of the merged read/write mechanism.

The invention is applicable to merged read/write heads where operation of the write mechanism heats the read mechanism. Such merged read write mechanisms include read mechanisms using magneto-resistive effects to read the data written on a surface of the disk drive. These magneto-resistive effects may include GMR effects, and TMR effects.

Figures 5A, 5B:
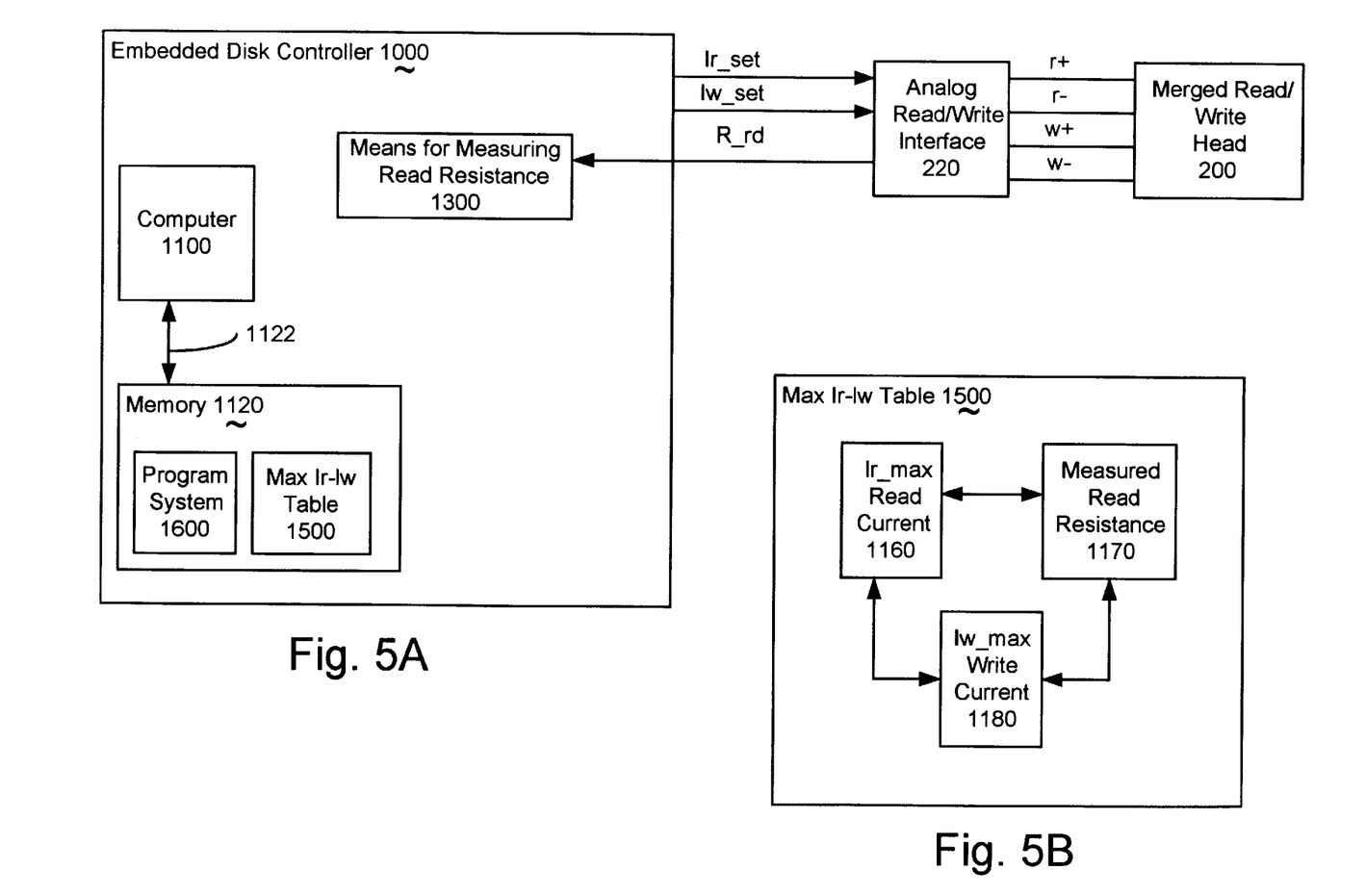
FIG. 5A illustrates a simplified schematic of a disk drive controller 1000 controlling an analog read/write interface 220, communicating with MR read/write head 200, where disk drive controller 1000 is operated by a computer controlled by program system 1600 implementing the inventive method of determining the maximum read bias current.
FIG. 5B illustrates Max_Ir table 1500 as found in FIG. 5A.

FIG. 5A illustrates a simplified schematic of a disk drive controller 1000 controlling an analog read/write interface 220, communicating with MR read/write head 240, where disk drive controller 1000 is operated by a computer controlled by program system 1600 implementing the inventive method of determining the maximum read bias current.

As in FIG. 2A, computer 1100 within embedded disk controller 1000 receives readings of the spin valve resistance R_rd from analog read/write interface 220. Computer 1100 also controls the read current Ir_set for read differential signal pair r+ and r−, as well as the write current Iw_set for write differential signal pair w+ and w−.

Note that the analog read/write interface may include more than one component in each of the read and write directions. These components may be physically separated. By way of example, a read channel preamplifier may be situated on the actuator arm mechanically holding the head slider containing the merged read/write head. A second component near the embedded disk controller may provide read bias current source under the control of the embedded controller and a resistance measurement means supporting the measurement of the read mechanism resistance based upon the read bias current. One of skill in the art will recognize that this is just one of a number of equivalent ways to control the read mechanism.

The process of reading the data storage surface using MR read/write head 240 includes the following. Computer 1100 accesses 1122 a memory 1120. Memory 1120 contains program system 1600 and the Max Ir-Iw table 1500. Program system 1600 and Max Ir-Iw table 1500 are part of the process of determining Ir_max and Iw_max, both based upon R_rd and Iw_set, as well as asserting currents on the read and write differential signal pairs.

Memory 1120 typically includes a non-volatile memory component. This non-volatile memory component is often used to store at least a portion of program system 1600 as well as Max Ir-Iw table 1500.

Today, a disk drive will perform an initialization process often known as read channel optimization. Read channel optimization is supposed to find the best parameters for read/write operation, which include at least read a bias current (Ir), write current Iw and write boost. To prevent damage and/or degradation of the read head due to high Ir during and after read channel optimization, a maximum allowed Ir 1160 based upon a measured hot MR read resistance 1170 is placed in a preliminary Max Ir table 1124 as found in the prior art.

Generating the table includes measuring the hot MR read resistance typically at a value such as 4 mA, and then selecting a read bias current Ir lower than the maximum allowed Ir current Ir 1160 associated with the measured hot MR read resistance 1170 as found in Table 1124.

FIG. 5B illustrates Max_Ir table 1500 as found in FIG. 5A.

The Max Ir-Iw table 1500 is preferably determined in the disk drive. The test conditions are typically over a range such as Ir from 3 mA to 7 mA and over the operating range of Iw and write operation frequencies.

There are several things of note in FIG. 5B. Adding knowledge of the write current reveals the determination of the maximum read bias current Ir, 1160, as something that satisfies the constraints of the write current setting Iw, 1180, as well as the measured hot read resistance MRR 1170.

The Max Ir-Iw table 1500 can consequently be implemented not only as a table, but as program steps within the program system residing in memory 1120.

The Max Ir-Iw table 1500 can also be implemented as all or part of a finite state machine.

The Max Ir-Iw table 1500 can also be implemented as all or part of an inferential system inferring the maximum read bias current Ir_max and maximum write current Iw_max from the indications of the write current setting and measured read resistance MRR. Such inferential systems may include, but are not limited to, neural networks, constraint rule systems, fuzzy logic systems and Horn clause collections.

Table 2 illustrates a maximum read current and a maximum write current, both based upon a measured read resistance MRR.

| Ir/Iw | 0 mA | 30 mA | 35 mA | 40 mA | 45 mA | 50 mA | 55 mA | 60 mA |
|---|---|---|---|---|---|---|---|---|
| 4.0 mA | 55 ohm | 54.0 ohm | 53.5 ohm | 53.0 ohm | 52.0 ohm | 50.5 ohm | 49.0 ohm | 47.0 ohm |
| 4.4 mA | 48 ohm | 49.0 ohm | 48.5 ohm | 48.0 ohm | 47.0 ohm | 45.5 ohm | 44.0 ohm | 42.0 ohm |
| 4.8 mA | 44 ohm | 45.0 ohm | 44.5 ohm | 44.0 ohm | 43.0 ohm | 41.5 ohm | 40.0 ohm | 38.0 ohm |
| 5.2 mA | 41 ohm | 42.0 ohm | 41.5 ohm | 41.0 ohm | 40.0 ohm | 38.5 ohm | 37.0 ohm | 35.0 ohm |
| 5.6 mA | 38 ohm | 39.0 ohm | 38.5 ohm | 38.0 ohm | 37.0 ohm | 35.5 ohm | 34.0 ohm | 32.0 ohm |
| 6.0 mA | 36 ohm | 37.0 ohm | 36.5 ohm | 36.0 ohm | 35.0 ohm | 33.5 ohm | 32.0 ohm | 30.0 ohm |
| 6.4 mA | 33 ohm | 34.0 ohm | 33.5 ohm | 33.0 ohm | 32.0 ohm | 30.5 ohm | 29.0 ohm | 27.0 ohm |
| 6.8 mA | 31 ohm | 32.0 ohm | 31.5 ohm | 31.0 ohm | 30.0 ohm | 28.5 ohm | 27.0 ohm | 25.0 ohm |

Table 2 illustrates by example indications of the measured read resistance in ohms (ohm) and indications of the read bias current Ir, shown along the left as a column and indications of the write current Iw shown across the top row of this table.

Note that table 2 illustrates write current indications as membership in exactly one of the following intervals: from 0 mA to 30 mA, from 30 mA to 35 mA, etc. and from 55 mA to 60 mA.

By way of example, the MRR may be 37.5 ohm and Iw may be set at 43 MA. Using Table 2, Ir_max may be determined as 5.6 mA. In other implementations of the invention, determination of Ir_max may yield a value between 5.6 mA and 5.2 mA.

Also by way of illustration, note that the above table could alternatively be constructed as a collection of program steps to be executed by a computer. One such statement in a computer programming language such as C for an entry of Table 2 might look like
if ((Iw>40*mA) && (Iw<=45*mA)&&(MRR>48.0*Ohm) && (MRR<=53.0*Ohm)) Ir_max=4.0*mA;

One skilled in the art will note that mA and Ohm are not C programming language primitives, but instead are indications of control conditions or observable conditions for the embedded disk controller.

One skilled in the art will also recognize that embedded control systems rarely use floating point numbers such as 48.0.

Embedded controllers preferably use fixed point numbers which indicate the condition of the physical system being controlled to the necessary level of accuracy for the reliable and efficient performance of the system objectives which include the reading and writing of data storage surfaces within the disk drive.

Figure 6A:
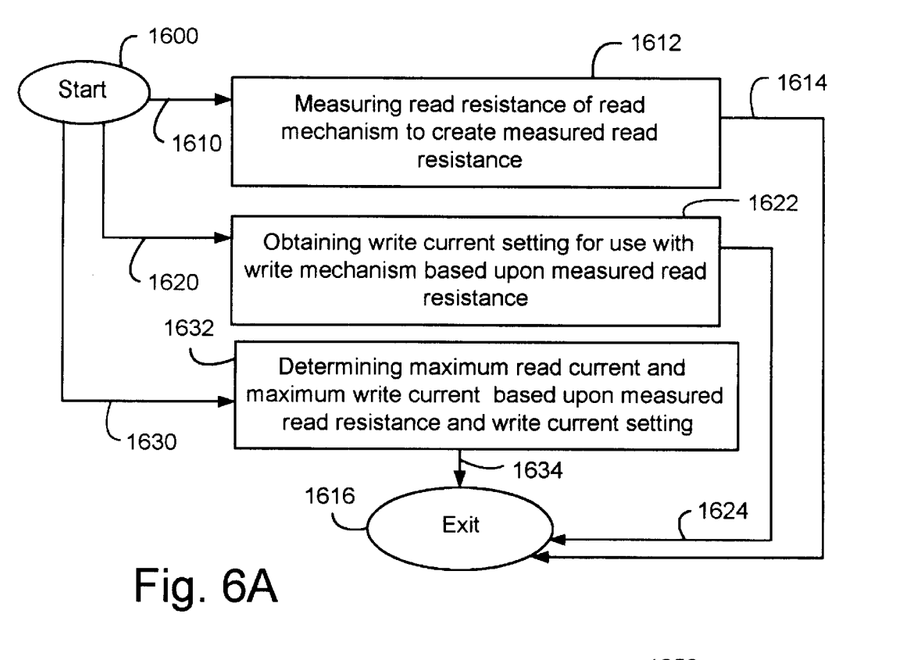
FIG. 6A illustrates a detail flowchart of program system 1600 of FIG. 5A for controlling the read operation for a merged read/write mechanism in a disk drive, where said merged read/write mechanism includes a write mechanism and a read mechanism.

FIG. 6A illustrates a detail flowchart of program system 1600 of FIG. 5A for controlling the read operation for a merged read/write mechanism in a disk drive, where the merged read/write mechanism includes a write mechanism and a read mechanism.

Arrow 1610 directs the flow of execution from starting operation 1600 to operation 1612. Operation 1612 performs measuring a read resistance of the read mechanism to create a measured read resistance (MRR). Arrow 1614 directs execution from operation 1612 to operation 1616. Operation 1616 terminates the operations of this flowchart.

Arrow 1620 directs the flow of execution from starting operation 1600 to operation 1622. Operation 1622 performs obtaining a write current setting in use with the write mechanism. Arrow 1624 directs execution from operation 1622 to operation 1616. Operation 1616 terminates the operations of this flowchart.

Arrow 1630 directs the flow of execution from starting operation 1600 to operation 1632. Operation 1632 performs mutually determining a maximum read current for the read mechanism and a maximum write current for the write mechanism, both based upon the measured read resistance and the write current setting. Arrow 1634 directs execution from operation 1632 to operation 1616. Operation 1616 terminates the operations of this flowchart.

Note that the read/write mechanism may include at least one read mechanism supporting reading through a magneto-resistive effect upon a disk drive surface. The read mechanism magneto-resistive effect includes a Giant Magneto-Resistive (GMR) effect, a Tunneling Magneto-Resistive (TMR) effect.

The surface of the disk drive may be removable from the disk drive and/or sealed into the disk drive.

Figure 6B:
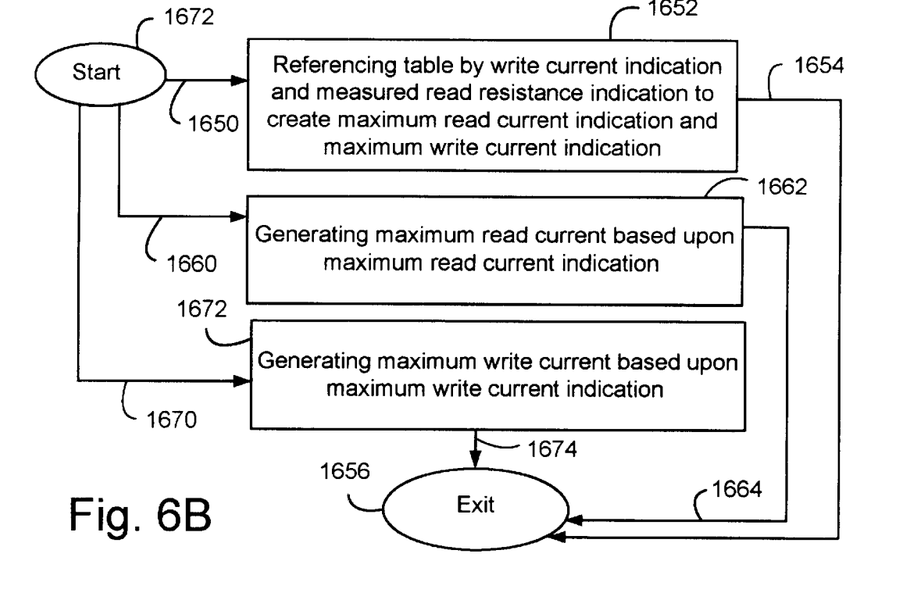
FIG. 6B illustrates a detail flowchart of operation 1632 of FIG. 6A for determining said maximum read current for said read mechanism.

FIG. 6B illustrates a detail flowchart of operation 1632 of FIG. 6A for determining the maximum read current for the read mechanism.

Arrow 1650 directs the flow of execution from starting operation 1632 to operation 1652. Operation 1652 performs referencing a table by a write current indication and by a measured read resistance indication to create a maximum read current indication and a maximum write current indication. Arrow 1654 directs execution from operation 1652 to operation 1656. Operation 1656 terminates the operations of this flowchart.

Arrow 1660 directs the flow of execution from starting operation 1632 to operation 1662. Operation 1662 performs generating the maximum read current based upon the maximum read current indication. Arrow 1664 directs execution from operation 1662 to operation 1656. Operation 1656 terminates the operations of this flowchart.

Arrow 1670 directs the flow of execution from starting operation 1632 to operation 1672. Operation 1672 performs generating the maximum write current based upon the maximum write current indication. Arrow 1674 directs execution from operation 1672 to operation 1656. Operation 1656 terminates the operations of this flowchart.

Note that the write current indication is based upon the write current setting for the write mechanism and measured read resistance indication is based upon the measured read resistance (MRR).

Figure 7A:
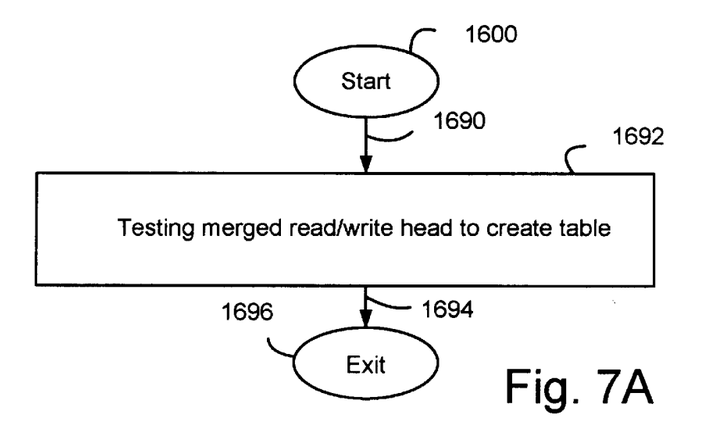
FIG. 7A illustrates a detail flowchart of program system 1600 of FIG. 5A for testing said merged read/write head to create said table.

FIG. 7A illustrates a detail flowchart of program system 1600 of FIG. 5A for testing the merged read/write head to create the table.

Arrow 1690 directs the flow of execution from starting operation 1600 to operation 1692. Operation 1692 performs testing the merged read/write head to create the table. Arrow 1694 directs execution from operation 1692 to operation 1696. Operation 1696 terminates the operations of this flowchart.

Figure 7B:
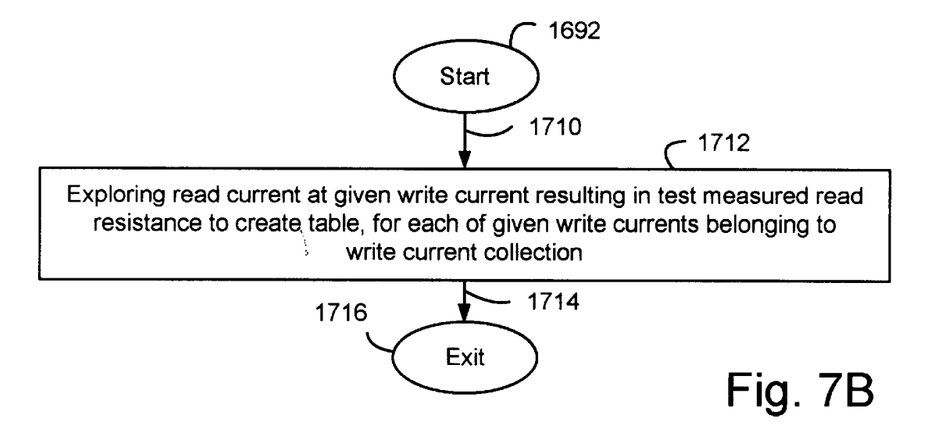
FIG. 7B illustrates a detail flowchart of operation 1612 of FIG. 7A for testing said merged read/write head.

FIG. 7B illustrates a detail flowchart of operation 1612 of FIG. 7A for testing the merged read/write head.

Arrow 1710 directs the flow of execution from starting operation 1612 to operation 1712. Operation 1712 performs exploring a read current at a given write current resulting in a test measured read resistance to create the table, for each of the given write currents belonging to a write current collection. Arrow 1714 directs execution from operation 1712 to operation 1716. Operation 1716 terminates the operations of this flowchart.

Figure 7C:
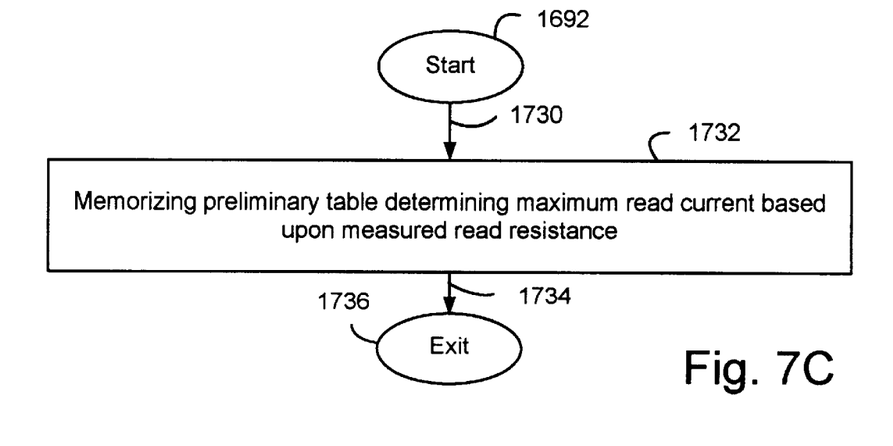
FIG. 7C illustrates a detail flowchart of operation 1712 of FIG. 7B for testing said read/write head.

FIG. 7C illustrates a detail flowchart of operation 1712 of FIG. 7B for testing the read/write head.

Arrow 1730 directs the flow of execution from starting operation 1712 to operation 1732. Operation 1732 performs providing a preliminary table determining a maximum read current based upon the measured read resistance. Arrow 1734 directs execution from operation 1732 to operation 1736. Operation 1736 terminates the operations of this flowchart.

Note that providing the preliminary table may preferably include memorizing the preliminary table within the embedded disk controller. The following program sequence preferably determines the maximum read current setting Iw when Ir>0 during a write operation:

1. Memorize the preliminary look up table data.
2. Ir=Ir_min, (for example, 3.0 mA)
3. Measure the hot resistance (R_h) of the read mechanism at Ir in read mode with Iw=0 mA.
    If R_h>the MRR of the preliminary lookup table
    Then Set Ir_max0=Ir and goto step 5
    Else goto step 4
4. Ir=Ir+·Ir. Goto step 3.
5. Ir=Ir_min
6. Iw=Iw_min, setting the write current to Iw
7. Measure the R_h of the read mechanism by applying at Iw and Ir
    If R_h>the MRR of the preliminary look up table at Ir_Max0
    Then set Iw_max[Ir]=Iw and goto step 9
    Else goto step 8
8. Iw=Iw+·Iw and goto step 7
9. If Ir=Ir_max0 Then goto step 10
    Else Ir=Ir+·Ir and goto step 6
10. Stop, Iw_max[Ir] has been determined as a function of Ir, where Ir<Ir_max0, for a merged read/write head.

The following program sequence preferably determines the maximum read current setting Iw when Ir>0 during a write operation. The first four steps are the same in these two sequences. From step 5 onward in the following sequence, Ir is set to 1 mA to allow the measure of resistance through the read mechanism.

1. Memorize the preliminary look up table data.
2. Ir=Ir_min, (for example, 3.0 mA)
3. Measure the hot resistance (R_h) of the read mechanism at Ir in read mode with Iw=0 mA.
    If R_h>the MRR of the preliminary lookup table
    Then Set Ir_max0=Ir and goto step 5
    Else goto step 4
4. Ir=Ir+·Ir. Goto step 3.
5. Measure the R_h of the read mechanism during writing with Iw=Iw_max and Ir=1 mA
    If R_h<the MRR of the preliminary look up table at Ir_max0,
    Then goto step 10. This happens when there is no significant heating of the read mechanism by writing with the write mechanism.
    Else goto step 6.
6. Measure cold R_c with Ir=1 mA during read mode.
7. Iw=Iw_min
8. Measure the R_h of the read mechanism by applying Iw and Ir=1 mA
9. If (R_h/R_c−1)<Max_·R/R,
    Then Iw=Iw+·Iw and goto step 8
    Else Iw_max=Iw
10. Stop. Iw_max has now been determined when the read/write head is only writing.

Figures 8A, 8B:
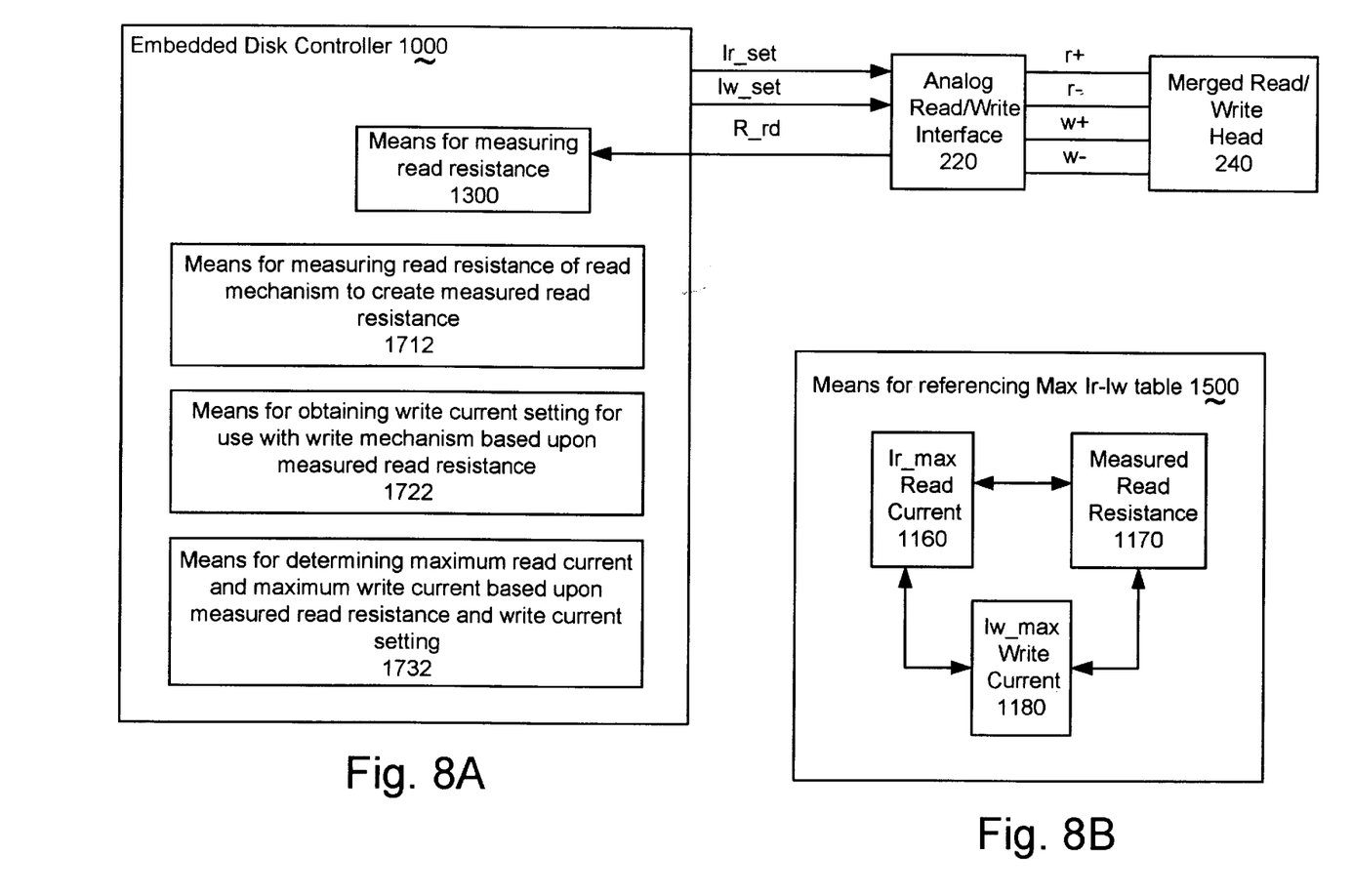
FIG. 8A illustrates an alternative schematic of the disk drive controller 1000 controlling an analog read/write interface 220, communicating with MR read/write head 200.
FIG. 8B illustrates a means for referencing a max-Ir-Iw table 1500.

FIG. 8A illustrates an alternative schematic of the disk drive controller 1000 controlling an analog read/write interface 220, communicating with MR read/write head 200. The disk controller 1000 includes the following. Means 1712 for measuring a read resistance of the read mechanism to create the measured read resistance. Means 1722 for obtaining a write current setting in use with the write mechanism. Means 1732 for mutually determining a maximum read current for the read mechanism and a maximum write current, based upon the measured read resistance and the write current setting.

FIG. 8B illustrates a means for referencing a max-Ir-Iw table 1500 with the Ir_max read current 1160, the measured resistance 1170 and the Iw_max write current 1180.

The preceding embodiments have been provided by way of example and are not meant to limit the scope of the following claims.

What is claimed is:

1. An embedded controller to control a read mechanism and a write mechanism, both included in a merged read/write head of a disk drive controlled by said embedded controller, comprising:

a computer accessing a memory containing a program system including at least two program steps; and means for said computer measuring a read resistance of said read mechanism;

wherein said program system includes the program steps of measuring a read resistance of said read mechanism to create said measured read resistance;

obtaining a write current setting in use with said write mechanism; and mutually determining a maximum read current for said read mechanism and a maximum write current for the write mechanism for the write mechanism, both based upon said measured read resistance and said write current setting; and wherein the program step mutually determining said maximum read current and said maximum write current is further comprised of the program steps of:

referencing a table by said measured read resistance indication to create a maximum read current indication and a write current maximum indication;

generating said maximum read current based upon said maximum read current indication; and generating said maximum write current based upon said maximum write current indication;

wherein said measured read resistance indication is based upon said measured read resistance.

wherein said write mechanism significantly heats said read mechanism based upon said write current in use with said write mechanism;

wherein said read mechanism supports reading through a magneto-resistive effect upon a surface of said disk drive belonging to a read effect collection including a Giant Magneto-Resistive (GMR) effect.

2. The apparatus of claim 1, wherein said read effect collection further includes a Tunneling Magneto-Resistive (TMR) effect.

3. The apparatus of claim 1, wherein said surface of said disk drive is removable from said disk drive.

4. The apparatus of claim 1, wherein said surface of said disk drive is sealed into said disk drive.

5. The apparatus of claim 1, wherein the program step referencing said table is further comprised of at least one member of the collection comprising:

an inferential engine inferring from said table based upon said write current indication and based upon said measured reading resistance indication to create said maximum read current indication; and at least one program step implementing said table based upon said write current indication and based upon said measured reading resistance indication to create said maximum read current indication.

6. The apparatus of claim 1, further comprising: means for testing said merged read/write head to create said table.

7. The apparatus of claim 6, wherein said means for testing said read/write head is further comprised of:

means for exploring a read current at a given write current resulting in a test measured read resistance creating said table, for each of said given write currents belonging to a write current collection.

8. The apparatus of claim 7, wherein said means for testing said read/write head is further comprised of:

means for memorizing a preliminary table determining a maximum read current based upon said measured read resistance;

wherein said means for exploring said read current, for each of said given write currents belonging to said write current collection, is further comprised of:

means for exploring said read current at a given write current resulting in a test measured read resistance consistent with said preliminary table to create said table, for each of said given write currents belonging to a predetermined write current collection.

9. The apparatus of claim 1, wherein at least one of said program steps is implemented as a member of the collection comprising:

at least part of a neural network;

at least part of a constraint rule list;

at least part of a fuzzy logic rule set; and at least part of a collection of Horn clauses.

10. A method of controlling the read operation for a merged read/write mechanism in a disk drive, wherein said merged read/write mechanism includes a write mechanism and a read mechanism, comprising the steps of:

measuring a read resistance of said read mechanism to create a measured read resistance;

obtaining a write current setting in use with said write mechanism; and mutually determining a maximum read current for said read mechanism and a maximum write current for said write mechanism, both based upon said measured read resistance and said write current setting;

wherein the step mutually determining said maximum read current and said maximum write current is further comprised of the step of:

referencing a table by a write current indication and by a measured read resistance indication to create a maximum read current indication and a maximum write current indication;

generating said maximum read current based upon said maximum read current indication;

generating said maximum write current based upon said maximum write current indication;

wherein said write current indication is based upon said write current setting; and wherein said measured read resistance indication is based upon said measured read resistance;

wherein said write mechanism significantly heats said read mechanism based upon said write current in use with said write mechanism.

wherein said read mechanism supports reading through a magneto-resistive effect upon a surface of said disk drive belonging to a read effect collection including a Giant Magneto-Resistive (GMR) effect.

11. The method of claim 10, wherein said read effect collection further includes a Tunneling Magneto-Resistive (TMR) effect.

12. The method of claim 10, wherein said surface of said disk drive is removable from said disk drive.

13. The method of claim 10, wherein said surface of said disk drive is sealed into said disk drive.

14. The method of claim 10, further comprising the step of:

testing said merged read/write head to create said table.

15. The method of claim 14, wherein the step testing said read/write head is further comprised of the steps of:

exploring a read current at a given write current resulting in a test measured read resistance to create said table, for each of said given write currents belonging to a write current collection.

16. The method of claim 15, wherein the step testing said read/write head is further comprised of the step of:

providing a preliminary table determining a maximum read current based upon said measured read resistance;

wherein the step exploring said read current, for each of said given write currents belonging to said write current collection, is further comprised of the steps of:

exploring said read current at a given write current resulting in a test measured read resistance consistent with said preliminary table to create said table, for each of said given write currents belonging to a predetermined write current collection.

17. A program system implementing the method of claim 10, residing in a memory accessibly coupled with a computer, wherein said program system is comprised of program steps implementing at least the steps of said method.

18. An embedded controller implementing the method of claim 10 to control a read mechanism and a write mechanism, both included in a merged read/write head of a disk drive, comprising:

said computer accessing said memory containing said program steps of claim 17; and means for measuring said resistance of said read mechanism to create said measured read resistance.

19. The program system of claim 17, wherein at least one of said program steps is implemented as a member of the collection comprising:

at least part of a neural network;

at least part of a constraint rule list;

at least part of a fuzzy logic rule set; and at least part of a collection of Horn clauses.

20. A method of controlling the read operation for a merged read/write mechanism in a disk drive, wherein said merged read/write mechanism includes a write mechanism and a read mechanism, comprising the steps of:

measuring a read resistance of said read mechanism to create a measured read resistance;

obtaining a write current setting in use with said write mechanism; and mutually determining a maximum read current for said read mechanism and a maximum write current for said write mechanism, both based upon said measured read resistance and said write current setting; and wherein said write mechanism significantly heats said read mechanism based upon said write current in use with said write mechanism.

21. The method of claim 20, wherein said read/write mechanism includes at least one read mechanism supporting reading through a magneto-resistive effect upon a surface of said disk drive.

22. The method of claim 21, wherein said magneto-resistive effect belongs to a read effect collection including a Giant Magneto-Resistive (GMR) effect and a Tunneling Magneto-Resistive (TMR) effect.

23. The method of claim 21, wherein said surface of said disk drive is removable from said disk drive.

24. The method of claim 21, wherein said surface of said disk drive is sealed into said disk drive.

25. The method of claim 20, wherein the step mutually determining said maximum read current and said maximum write current is further comprised of the step of:

referencing a table by a write current indication and by a measured read resistance indication to create a maximum read current indication and a maximum write current indication;

generating said maximum read current based upon said maximum read current indication; and generating said maximum write current based upon said maximum write current indication;

wherein said write current indication is based upon said write current setting; and wherein said measured read resistance indication is based upon said measured read resistance.

26. The method of claim 25, further comprising the step of:

testing said merged read/write head to create said table.

27. The method of claim 26, wherein the step testing said read/write head is further comprised of the steps of:

exploring a read current at a given write current resulting in a test measured read resistance to create said table, for each of said given write currents belonging to a write current collection.

28. The method of claim 27, wherein the step testing said read/write head is further comprised of the step of:

providing a preliminary table determining a maximum read current based upon said measured read resistance;

wherein the step exploring said read current, for each of said given write currents belonging to said write current collection, is further comprised of the steps of:

exploring said read current at a given write current resulting in a test measured read resistance consistent with said preliminary table to create said table, for each of said given write currents belonging to a predetermined write current collection.

29. A program system implementing the method of claim 20, comprised of program steps implementing at least the steps of said method, residing in a memory accessibly coupled with a computer.

30. An embedded controller implementing the method of claim 20 to control a read mechanism and a write mechanism, both included in a merged read/write head of a disk drive, comprising said computer accessing said memory containing said program steps of claim 29.

31. The program system of claim 29, wherein at least one of said program steps is implemented as a member of the collection comprising:

at least part of a neural network;

at least part of a constraint rule list;

at least part of a fuzzy logic rule set; and at least part of a collection of Horn clauses.

32. An apparatus controlling the read operation for a merged read/write mechanism in a disk drive, wherein said merged read/write mechanism includes a write mechanism and a read mechanism, comprising:

means for measuring a read resistance of said read mechanism to create a measured read resistance;

means for obtaining a write current setting in use with said write mechanism; and means for mutually determining a maximum read current for said read mechanism and a maximum write current, both based upon said measured read resistance and said write current setting; and wherein said write mechanism significantly heats said read mechanism based upon said write current in use with said write mechanism.

33. The apparatus of claim 32,
wherein said read/write mechanism includes at least one read mechanism supporting reading through a magneto-resistive effect upon a surface of said disk drive.

34. The apparatus of claim 33,
wherein said magneto-resistive effect belongs to a read effect collection comprising a Giant Magneto-Resistive (GMR) effect and a Tunneling Magneto-Resistive (TMR) effect.

35. The apparatus of claim 33,
wherein said surface of said disk drive is removable from said disk drive.

36. The apparatus of claim 33,
wherein said surface of said disk drive is sealed into said disk drive.

37. The apparatus of claim 32,
wherein said means for mutually determining said maximum read current and said maximum write current is further comprised of:
means for referencing a table by a write current indication and by a measured read resistance indication to create a maximum read current indication and a maximum write current indication;
means for generating said maximum read current based upon said maximum read current indication; and
means for generating said maximum write current based upon said maximum write current indication;
wherein said write current indication is based upon said write current setting; and
wherein said measured read resistance indication is based upon said measured read resistance.

38. The apparatus of claim 37,
wherein said means for referencing said table is further comprised of at least one member of the collection, comprising:
a computer referencing said table by said write current indication and by said measured read resistance indication to create said maximum read current indication and said maximum write indication;
a finite state machine referencing said table by said write current indication and by said measured read resistance indication to create said maximum read current indication and said maximum write indication;
an inferential engine inferring from said table based upon said write current indication and based upon said measured reading resistance indication to create said maximum read current indication and said maximum write indication; and
a computer executing a program system comprised of program steps implementing said table based upon said write current indication and based upon said measured reading resistance indication to create said maximum read current indication and said maximum write indication.

39. The apparatus of claim 37, further comprising:
means for testing said merged read/write head to create said table.

40. The apparatus of claim 39,
wherein said means for testing said read/write head is further comprised of:
means for exploring a read current at a given write current resulting in a test measured read resistance creating said table, for each of said given write currents belonging to a write current collection.

41. The apparatus of claim 40,
wherein said means for testing said read/write head is further comprised of:
means for memorizing a preliminary table determining a maximum read current based upon said measured read resistance;
wherein said means for exploring said read current, for each of said given write currents belonging to said write current collection, is further comprised of:
means for exploring said read current at a given write current resulting in a test measured read resistance consistent with said preliminary table to create said table, for each of said given write currents belonging to a predetermined write current collection.

42. The apparatus of claim 32,
wherein at least one of said means of claim 32 are implemented as a program step belonging to a program system at least partly controlling a computer;
wherein said program step resides in a memory accessibly coupled with said computer.

43. An embedded controller including the apparatus of claim 32 to control a read mechanism and a write mechanism, both included in a merged read/write head of a disk drive controlled by said embedded controller, comprising:
said computer accessing said memory containing said program steps of claim 42; and
means for said computer measuring said resistance of said read mechanism.

44. The apparatus of claim 42,
wherein at least one of said program steps is implemented as a member of the collection comprising:
at least part of a neural network;
at least part of a constraint rule list;
at least part of a fuzzy logic rule set; and
at least part of a collection of Horn clauses.

* * * * *